June 2, 1931.  W. E. KERSHAW  1,807,595
ELECTRIC STORAGE BATTERY
Filed Jan. 11, 1928

INVENTOR
William Ernest Kershaw
BY
Augustus B. Stoughton
ATTORNEY.

WITNESS:
Robt R Ketchel.

Patented June 2, 1931

1,807,595

UNITED STATES PATENT OFFICE

WILLIAM E. KERSHAW, OF GWYNEDD VALLEY, PENNSYLVANIA

ELECTRIC STORAGE BATTERY

Application filed January 11, 1928. Serial No. 245,819.

Objects of the present invention are to provide for the passage of electrolyte from cell to cell so that it can find its level in the different cells thus permitting of the use of one filling opening for a plurality of cells, and to provide for automatically sealing the cells one from another against electric leakage.

The invention will be claimed at the end hereof but will be first described in connection with the accompanying drawings forming part hereof and in which Figure 1 is an elevational view principally in section of parts of a storage battery embodying features of the invention.

The flow of electrolyte through the cell walls and the sealing of the walls against electric leakage is accomplished, according to the method of my invention, by establishing communication through the walls and below the normal or working level of the electrolyte for the flow of the electrolyte from cell to cell, and sealing said communication against electric leakage by accumulating gas in the communication.

Figure 1:
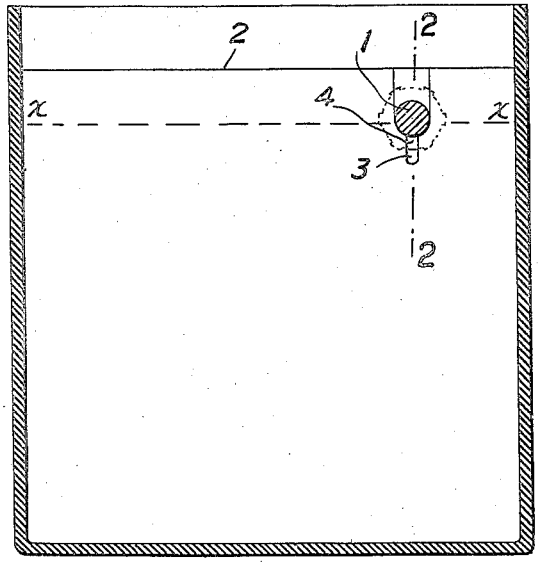
Figure 2:
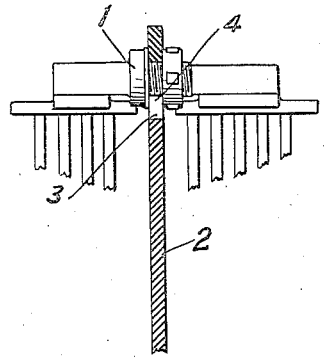
Fig. 2 is a section on the line 2—2 of Fig. 1.

Referring to the drawings, more particularly Figs. 1 and 2, in which the parts which are duplicated are shown singly and without duplication, the intercell connectors 1 happen to be shown as confined within the interior of the battery and as arranged through its vertical cell walls 2. The battery is provided below its working electrolyte level, indicated diagrammatically at $x$—$x$, and between its cells with channels 3. The electrolyte is frequently filled with gas bubbles of which some are so small that they remain suspended for a considerable length of time and are carried to all parts of the cell by liquid currents. Furthermore the electrolyte is at all times saturated with gas in solution and some of this gas is released upon increase of temperature. The gaseous bubbles collect upon the surfaces of the channels, as they do upon all surfaces of the cell, and in the channels they combine into larger bubbles which interrupt the fluid path through the channels and prevent flow of current from cell to cell. However, when filling from a single filling opening in one of the cells the slight difference in head between that cell and an adjacent cell will temporarily displace the bubble and permit the electrolyte level of the cells to equalize. Until the bubbles have again collected in the channels there will be appreciable flow of current, but it is of short duration because the channels soon fill up with gas bubbles.

Figure 3:
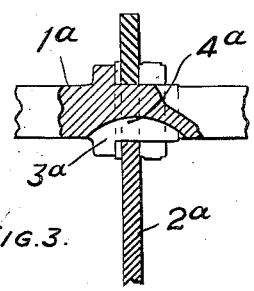
Fig. 3 is a sectional view illustrating a modification.
Figure 4:
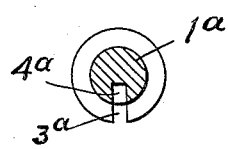
Fig. 4 is a section through the connector shown in Fig. 3.

The construction and mode of operation of the modification shown in Figs. 3 and 4 are as above described except that the channel $3^a$, is formed through the intercell connector $1^a$, instead of through a cell wall.

The constructions illustrated in the drawings provide traps in the nature of inverted pockets 4 and $4^a$, which when present, make the trapping of the gas more positive than simple openings, channels or straight ducts would do.

It will be obvious to those skilled in the art to which the invention relates that modifications may be made in details of construction and arrangement and, in matters of mere form, without departing from the spirit of the invention which is not limited to such matters, or otherwise than the prior art and the appended claims may require.

I claim:

1. A storage battery having cells and an intercell wall and provided below its electrolyte level and between its cells with a channel having an inverted pocket and through which electrolyte may flow and find its level in the different cells and having a single opening for filling electrolyte to the same level in all the cells.

2. A storage battery having cells and an intercell wall and provided below its electrolyte level and between its cells with a channel of inverted U-shape through which electrolyte may flow, and having a single opening for filling electrolyte to the same level in all cells.

3. A storage battery having cells, an intercell wall, and a metallic intercell connector confined within its interior, said battery being provided with a channel having a trap chamber therein formed between said intercell wall and said metallic intercell connector.

WILLIAM E. KERSHAW.